: 2,781,341
Patented Feb. 12, 1957

2,781,341

PROCESS FOR PREPARING SODIUM CARBOXY-METHYLCELLULOSE

Paulus Hermijnus de Ruyter, Arnhem, Netherlands, assignor to Algemene Kunstzijde Unie, N. V., Arnhem, Netherlands, a corporation of the Netherlands No Drawing. Application January 22, 1952,
Serial No. 267,689

Claims priority, application Netherlands February 7, 1951

2 Claims. (Cl. 260—232)

This invention relates to the preparation of sodium carboxymethylcellulose that is low in salt content. More particularly, the invention relates to the preparation of sodium carboxymethylcellulose low in salt content by a process during the course of which the crude sodium carboxymethylcellulose is treated with water-containing organic relatively low molecular weight polar liquids, such as methanol, ethanol or acetone.

One of the principal objects of the present invention is to provide a new and improved method for preparing sodium carboxymethylcellulose that is characterized by an unusually low salt content. A still further object of the invention is to provide a new and improved method for preparing relatively salt-free sodium carboxymethylcellulose by a process that involves treating the crude product with aqueous mixtures of organic polar liquids with relatively minor losses of the said organic polar liquids.

The manner in which these and other objects and features of the invention are attained will appear more fully from the following description thereof, in which reference is made to typical and preferred procedures in order to indicate more fully the nature of the invention, but without intending to limit the invention thereby.

When preparing sodium carboxymethylcellulose (sometimes hereinafter referred to for brevity as Na—CMC), an alkali cellulose, usually sodium cellulose, is mixed with sodium chloroacetate in a suitable mixer, and the mixture is thereupon heated to a temperature between 40° and 70° C. The high alkalinity of the resultant mixture is then neutralized and reduced with acid and weakly alkaline neutralizing agents, respectively. Among such agents may be mentioned acetic acid or other organic acids which produce water-soluble salts, sodium bicarbonate, carbonic acid and ammonium chloride.

The sodium carboxymethylcellulose obtained in this manner is contaminated with substantial amounts of water-soluble salts, such as NaCl, $Na_2CO_3$, sodium acetate, or sodium glycolate.

In order to remove the impurities, one generally treats the crude sodium carboxymethylcellulose with a water-containing organic polar liquid, for example aqueous methanol or ethanol associated with 30% water. A certain minimum content of the polar liquid is required for the operation, because if too little is employed the sodium carboxymethylcellulose will swell too much and thus gelatinize. The content of the organic polar liquid must be such that, after mixing with the crude sodium carboxymethylcellulose, the water present therein does not decrease the content of the organic polar liquid present in the total amount of liquid to below 40%. Furthermore, in order to bring about an effective removal of the salts from the sodium carboxymethylcellulose, it is also desirable that the content of organic polar liquid in the total quantity of liquid present in the crude sodium carboxymethylcellulose shall not exceed 60%.

After mixing with the dilute water-containing organic polar liquid, the mixture is then sucked off or centrifuged. The quantity of liquid remaining behind after this operation is rather large, e. g., more than 100% calculated on the dry basis. When drying directly, too much salt will still be retained in the sodium carboxymethylcellulose and also so much organic polar liquid, for example alcohol, will be lost during the process that economically such a process cannot be justified. Consequently, having due regard to the desired low salt content in the final product, it is necessary to repeat the treatment a few times, but in the final drying step a relatively large volume of the organic polar liquid will have to be evaporated. The content of alcohol or other organic polar liquid, calculated on the weight of the sodium carboxymethylcellulose, is of the order of 50%. Consequently, the drying must be carried out in such fashion that the alcohol or other organic polar liquid can be recovered, as otherwise the process becomes economically unsound. Moreover, the recovery of the alcohol or other organic polar liquid involves processing losses and additional expense as well.

According to the present invention, I have discovered that it is possible to produce a sodium carboxymethylcellulose that is relatively low in salt content in a much simpler and better way than that described above, while at the same time restricting very appreciably the loss of alcohol or other organic polar liquid.

More particularly, I have discovered that these desirable results may be readily obtained if one subjects the crude sodium carboxymethylcellulose which has been treated with the dilute aqueous organic polar liquid to a pressure of at least 3 atmospheres. Preferably pressures of the order of 6 or 7 atmospheres are employed for this purpose.

In order to effect a very economic application of the process according to the present invention, it is desirable to apply the pressure to the crude reaction mixture that has been treated with the aqueous organic polar liquid by means of a screw press, in which case it is possible to perform the process continuously and even more economically. Desirably the expressing operation can also take place after first sucking off or centrifuging a part of the dilute organic polar liquid from the crude sodium carboxymethylcellulose, during which preliminary operation the applied pressure is less than 3 atmospheres.

My research has shown that according to the process of the present invention an equally good but far more economical purification of the Na—CMC is obtained than according to the known process. When pressing according to the process of the present invention the mass is freed from liquid to a far greater extent than can be obtained merely by suction or centrifuging. When the crude Na—CMC is mixed with approximately a 3-fold quantity of the water-containing organic polar liquid, even after once pressing at a pressure of at least 3 atmospheres and preferably a pressure of at least 6 atmospheres, a surprisingly favorable removal of the water soluble salts is obtained in one treatment and only a small amount of the organic polar liquid remains in the pressed cake, for example about 5–6% of ethanol calculated on the weight of the dry Na—CMC. When the treatment is repeated once again an almost pure Na—CMC is obtained, whereby the loss of organic polar liquid can be considered unimportant.

For further elucidating the process according to the present invention, the following example is given:

Example

Before neutralizing with acetic acid, a quantity of the crude reaction product of alkali cellulose with sodium chloroacetate had the following composition:

| | Percent |
|---|---|
| Na—CMC | 38.2 |
| Sodium salts | 23.9 |
| Water | 37.9 |

The crude product was neutralized with acetic acid and thereupon mixed with a 3-fold quantity by weight of aqueous ethanol (62% ethanol). After a 15 minutes' mixing the mixture was pressed at 7 atmospheres. After this first treatment the composition of the pressed mass was as follows:

| | Percent |
|---|---|
| Na—CMC | 51.2 |
| Sodium salts | 8.4 |
| Water | 37.1 |
| Ethanol | 3.3 |

The mass was again mixed well with a 3-fold quantity by weight of 55% ethanol and after a 15 minutes' mixing pressed at 7 atmospheres in the same way as above.

The pressed mass then had the following composition:

| | Percent |
|---|---|
| Na—CMC | 56.4 |
| Sodium salts | 2.7 |
| Water | 37.7 |
| Ethanol | 3.2 |

Calculated on dry Na—CMC, the loss of alcohol amounted to about 5.7% and when the mixture is pressed at 4 atmospheres only, this loss is about 8%. Still higher pressures decrease this loss to a very slight degree only, so that it is not economical to apply pressures higher than approximately 6–7 atmospheres.

After pressing, the mass was dried in conventional manner. The loss of alcohol obtained as stated above means a smaller loss in money than that occurring in the method hitherto employed in which the Na—CMC mass, which still contains much liquid, must be dried in such a way that the organic liquid can be recovered.

The washing of the Na—CMC product can be accelerated by using relatively large quantities of the water-containing organic polar liquid. Per unit weight of the crude Na—CMC product, 10–15 quantities by weight of the dilute organic polar liquid can be used, but such liquid quantities mean an increased loading of the press. In such cases it is desirable initially to free the crude Na—CMC product from a part of the liquid, which can be done by suction or centrifuging or suchlike method. In most cases it is sufficient to remove so much liquid that approximately 200%, calculated on the dry mass, still remains.

As indicated above, it is particularly advantageous to express the crude Na—CMC product with the aid of a screw press. The pressure obtained with such a press, though insufficient for some technical purposes, is entirely adequate for the process according to the present invention. With the aid of a screw press a continuous and cheap method of pressing can be obtained, and this is very important in connection with the desired relatively low price of the final purified product.

I am aware that Houghton (U. S. Patent No. 2,513,725) has previously suggested broadly the idea of subjecting cellulose ethers to pressure in a mechanical press (Houghton at column 3, lines 61–62), but apparently Houghton merely contemplated that mechanical pressing was an equivalent for centrifuging, whereas in centrifuging operations the pressures are always lower than 3 atmospheres. Houghton's working examples suggest merely that the cellulose ether material is "pressed in a cloth" (Houghton at column 5, lines 25 and 72) without indicating the magnitude of the pressure. My investigations, on the other hand, have shown that when operating in accordance with Houghton's method so much alcohol remains in the sodium carboxymethylcellulose mass that it must be recovered by steaming or otherwise, in sharp contradistinction to the herein-disclosed method in which the amount of alcohol that remains in the mass is so small as to be negligible.

While specific examples of preferred methods embodying the present invention have been set forth above, it will be apparent that many changes and modifications may be made in the methods of procedure without departing from the spirit of the invention. It will therefore be understood that the example cited and the particular proportions and methods of operations set forth above are intended to be illustrative only and are not intended to limit the scope of the invention.

What is claimed is:

1. In a process for preparing sodium carboxymethylcellulose that is relatively low in salt content in which crude sodium carboxymethylcellulose is treated with a water-containing relatively low molecular weight organic polar liquid selected from the class consisting of methanol, ethanol and acetone and the polar liquid is thereafter separated at a pressure of less than 3 atmospheres, the improvement comprising thereafter subjecting the sodium carboxymethylcellulose mass, immediately after the separation at a pressure of less than 3 atmospheres, to a pressure of the order of 6 to 7 atmospheres whereby the preponderate portion of the polar liquid is selectively removed from the sodium carboxymethylcellulose.

2. A process as defined in claim 1, in which the pressing operation is conducted continuously.

References Cited in the file of this patent
UNITED STATES PATENTS

| | | |
|---|---|---|
| 2,331,864 | Swinehart | Oct. 12, 1943 |
| 2,513,725 | Houghton | July 4, 1950 |
| 2,513,807 | Lamborn | July 4, 1950 |